US010792736B1

(12) United States Patent
Velamakuri

(10) Patent No.: US 10,792,736 B1
(45) Date of Patent: Oct. 6, 2020

(54) LIGHTWEIGHT INTELLIGENT TOP-TOOLING APPARATUS

(71) Applicant: Kitagawa-Northtech, Inc., Schaumburg, IL (US)

(72) Inventor: Naga Sai Chakravarthy Velamakuri, Schaumburg, IL (US)

(73) Assignee: Kitagawa-Northtech, Inc., Schaumburg, IL (US)

( * ) Notice: Subject to any disclaimer, the term of this patent is extended or adjusted under 35 U.S.C. 154(b) by 0 days.

(21) Appl. No.: 16/419,112

(22) Filed: May 22, 2019

Related U.S. Application Data

(60) Provisional application No. 62/676,930, filed on May 26, 2018.

(51) Int. Cl.
| | |
|---|---|
| *B23B 31/10* | (2006.01) |
| *B33Y 80/00* | (2015.01) |
| *B33Y 70/10* | (2020.01) |
| *B23Q 17/00* | (2006.01) |
| *B33Y 10/00* | (2015.01) |
| *B29C 64/10* | (2017.01) |
| *B29K 307/04* | (2006.01) |

(52) U.S. Cl.
CPC .......... *B23B 31/102* (2013.01); *B23Q 17/006* (2013.01); *B33Y 70/10* (2020.01); *B33Y 80/00* (2014.12); *B23B 2231/04* (2013.01); *B23B 2260/128* (2013.01); *B29C 64/10* (2017.08); *B29K 2307/04* (2013.01); *B33Y 10/00* (2014.12); *Y10T 279/21* (2015.01)

(58) Field of Classification Search
CPC .............. B23B 31/102; B23B 2231/04; B23B 2260/128; B23Q 17/006; B33Y 70/00; B33Y 70/10; B33Y 80/00
See application file for complete search history.

(56) References Cited

U.S. PATENT DOCUMENTS

| | | | | |
|---|---|---|---|---|
| 3,396,982 | A | * | 8/1968 | Sampson ............... B23B 31/162 279/120 |
| 3,945,275 | A | * | 3/1976 | Ovanin ............. B23B 31/16195 82/165 |
| 4,909,521 | A | * | 3/1990 | Ovanin ................ B23Q 1/0009 279/111 |

(Continued)

*Primary Examiner* — Eric A. Gates
(74) *Attorney, Agent, or Firm* — The Law Offices of Konrad Sherinian LLC

(57) ABSTRACT

A lightweight intelligent top-tooling device integrates with an instrument. The instrument can be a sensing device. The instrument is placed inside a part of the lightweight intelligent top-tooling device during manufacturing process. The lightweight intelligent top-tooling device includes a locator and three top-jaws. The locator is engaged to a chuck of a metal cutting tool when assembled. The top-jaws attached to the locator are adapted to grip a workpiece. The lightweight intelligent top-tooling device is manufactured by a 3D printer. A 3D model of a part of the lightweight intelligent top-tooling device is first created. The 3D model is sliced into layers. The 3D printer prints out the layers of the lightweight intelligent top-tooling device. Media journals are created and the sensing device is placed during the printing process. The lightweight intelligent top-tooling device is printed with composite materials. One type of composite material is CFRP.

10 Claims, 18 Drawing Sheets

(56) References Cited

U.S. PATENT DOCUMENTS

| | | | | |
|---|---|---|---|---|
| 6,102,057 | A * | 8/2000 | Vogtmann | H01L 21/68 134/144 |
| 6,257,077 | B1 * | 7/2001 | Patterson | B23B 31/00 340/680 |
| 8,246,029 | B2 * | 8/2012 | Kawakami | B23Q 1/009 269/228 |
| 9,839,981 | B2 * | 12/2017 | Zhang | B23Q 3/18 |
| 10,493,575 | B2 * | 12/2019 | Hediger | B23B 31/1071 |
| 2016/0256934 | A1 * | 9/2016 | Schweigert | B25B 1/241 |
| 2019/0377320 | A1 * | 12/2019 | Eppler | B23Q 17/006 |

* cited by examiner

500

600

LIGHTWEIGHT INTELLIGENT TOP-TOOLING APPARATUS

CROSS REFERENCE TO RELATED APPLICATIONS

This application claims the benefit and priority of U.S. Provisional Patent Application No. 62/676,930, entitled "LIGHTWEIGHT INTELLIGENT TOP-TOOLING APPARATUS", filed May 26, 2018, which is hereby incorporated by reference in its entirety.

FIELD OF THE DISCLOSURE

The present invention generally relates to a lightweight top-tooling device, and more particularly relates to a lightweight top-tooling device printed using composite material. More particularly still, the present disclosure relates to a lightweight intelligent top-tooling device printed using composite material and having an integrated instrument.

DESCRIPTION OF BACKGROUND

Chucks are widely used for holding objects. For instance, chucks of drills and mills hold rotating tools (such as metal cutting tools); and chucks of lathes hold rotating workpieces. Chucks are prevalent in metal cutting machinery. They usually incorporate top-tooling devices for direct engagement with held objects, such as workpieces. As used herein, all objects held by or engaged with top-tooling devices are termed as workpieces.

When in operation, chucks are rotated at high revolutions per minute ("RPMs"). To reach a certain RPM, chucks are first accelerated. The time for a chuck to spin from zero (0) RPM to a desired high RPM is termed herein as the acceleration time (also referred to herein as acceleration cycle). The acceleration cycle does not add any economic value. It is wasted time. Oftentimes, chucks need to be slowed down. In many situations, chucks rotating at high RPMs need to be slowed down to zero RPM. The time for a chuck to spin from a higher RPM to a lower (such as zero) RPM is termed herein as the deceleration time (also referred to herein as deceleration cycle). The deceleration time is also wasted time and does not produce any economic value. It is clear that rapid acceleration and deceleration (meaning short acceleration cycle and deceleration cycle) save time and thus provide economic value. Such benefits are highly desirable in advanced rotating metal cutting machinery.

Oftentimes, top-tooling devices need to add sensing capabilities. Sensors are attached to the top-tooling devices to achieve the goal. The addition of sensing capability is expensive and time consuming. Furthermore, it creates constraints limiting freedom of design and functions of the top-tooling devices.

Accordingly, there is a need for a lightweight top-tooling apparatus that lowers the mass moment of inertia and reduces centrifugal forces. In addition, the lightweight top-tooling device has added structural integrity. Furthermore, there is a need for a lightweight intelligent top-tooling device with built-in sensing capabilities.

OBJECTS OF THE DISCLOSED SYSTEM, METHOD, AND APPARATUS

Accordingly, it is an object of this disclosure to provide a lightweight intelligent top-tooling device.

Another object of this disclosure is to provide a lightweight intelligent top-tooling device for a metal cutting chuck.

Another object of this disclosure is to provide a lightweight intelligent top-tooling device with an integrated instrument.

Another object of this disclosure is to provide a lightweight intelligent top-tooling device with an integrated sensing device.

Another object of this disclosure is to provide a lightweight intelligent top-tooling device printed by a 3D printer using composite material.

Another object of this disclosure is to provide a lightweight top-tooling device.

Another object of this disclosure is to provide a lightweight top-tooling device made of composite material.

Another object of this disclosure is to provide a lightweight top-tooling device made of Carbon Fibre Reinforced Polymer ("CFRP").

Another object of this disclosure is to provide a lightweight top-tooling device printed by a 3D printer using composite material.

Another object of this disclosure is to provide a lightweight top-tooling device printed by a 3D printer using CFRP.

Another object of this disclosure is to provide a lightweight intelligent top-tooling device printed by a 3D printer using CFRP for a metal cutting tool.

Another object of this disclosure is to provide a chuck with a lightweight intelligent top-tooling device.

Another object of this disclosure is to provide a metal cutting tool with chuck and a lightweight intelligent top-tooling device.

Other advantages of this disclosure will be clear to a person of ordinary skill in the art. It should be understood, however, that a system or method could practice the disclosure while not achieving all of the enumerated advantages, and that the protected disclosure is defined by the claims.

SUMMARY OF THE DISCLOSURE

Generally speaking, pursuant to the various embodiments, the present disclosure provides a lightweight intelligent top-tooling device. The lightweight intelligent top-tooling device is made of composite material and thus significantly lighter than steel, hardened steel, alloy steel and other types of heavy metal materials. It is even lighter than aluminum top-tooling devices. The lightweight intelligent top-tooling device is integrated with one or more electronic instruments, such as sensing devices. The lightweight intelligent top-tooling device is created by a 3D printer following a specialized printing process or created by machining on a composite block. The 3D modeling and sliced layers of the top-tooling device part allow any types of structures of top-tooling devices to be created. The lightweight intelligent top-tooling device is printed using composite material, such as CFRP. The integrated instrument is embedded into the lightweight intelligent top-tooling device when a part or whole of the lightweight intelligent top-tooling device is being printed. The lightweight intelligent top-tooling device includes a locator adapted to be attached to a chuck of a metal cutting tool. The lightweight intelligent top-tooling device also incorporates multiple top-jaws for gripping a workpiece. The sensing device helps the locator to locate the workpiece. The locator's surface mates with the chuck's face when assembled. The locator also incorporates three locator posts extending away from a platform of the locator.

The three locator posts each incorporate an air media hole. The lightweight intelligent top-tooling device also has internal media journals, including three air media holes of the three locator posts, created when printed.

Further in accordance with the present teachings are methods of manufacturing the lightweight intelligent top-tooling device using additive processes performed by 3D printers. One of such methods includes generating a 3D model of each part of the lightweight intelligent top-tooling device, slicing the 3D model into layers, sending the layers to a 3D printer, printing a subset of the layers, pausing the printing, placing an instrument into the lightweight intelligent top-tooling device, printing the remaining layers, and finishing the printed lightweight intelligent top-tooling device.

BRIEF DESCRIPTION OF THE DRAWINGS

Although the characteristic features of this disclosure will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

A person of ordinary skills in the art will appreciate that elements of the figures above are illustrated for simplicity and clarity, and are not necessarily drawn to scale. The dimensions of some elements in the figures may have been exaggerated relative to other elements to help understanding of the present teachings. Furthermore, a particular order in which certain elements, parts, components, modules, steps, actions, events and/or processes are described or illustrated may not be actually required. A person of ordinary skill in the art will appreciate that, for the purpose of simplicity and clarity of illustration, some commonly known and well-understood elements that are useful and/or necessary in a commercially feasible embodiment may not be depicted in order to provide a clear view of various embodiments in accordance with the present teachings.

DETAILED DESCRIPTION

Figure 1:
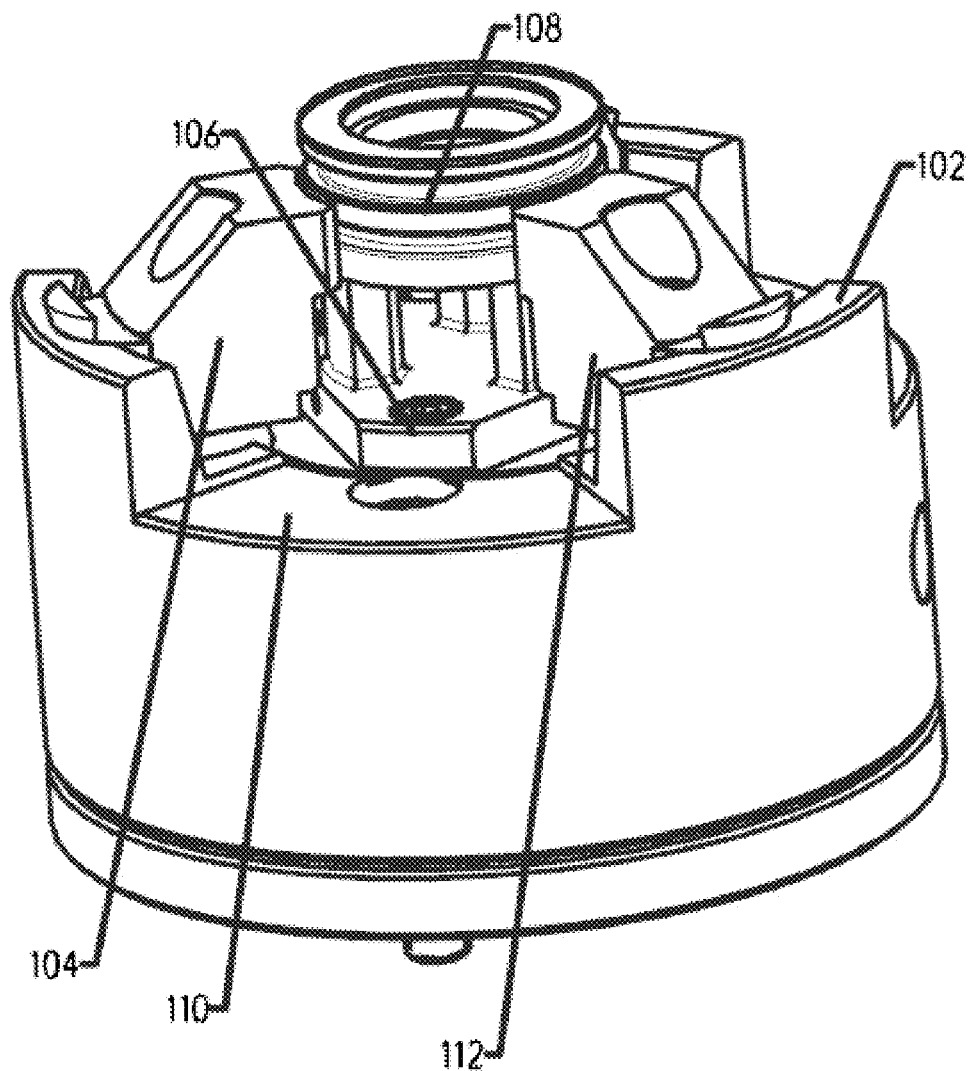
FIG. 1 is an isometric view of a chuck with a top-tooling device attached in accordance with this disclosure.

A conventional chuck with a top-tooling device attached to is shown and generally indicated at 100 in FIG. 1. The chuck 100 includes a chuck body 102, a chuck face 110, and a top-tooling device 112 attached to the chuck body. The top-tooling device 112 incorporate three top-jaws 104 and a locator 106. The locator 106 is used to locate an object 108 (such as a tool or a workpiece), while the three top-jaws 104 are used to grip the object 108. Precise location and accurate gripping is required in manufacturing.

Figure 2:
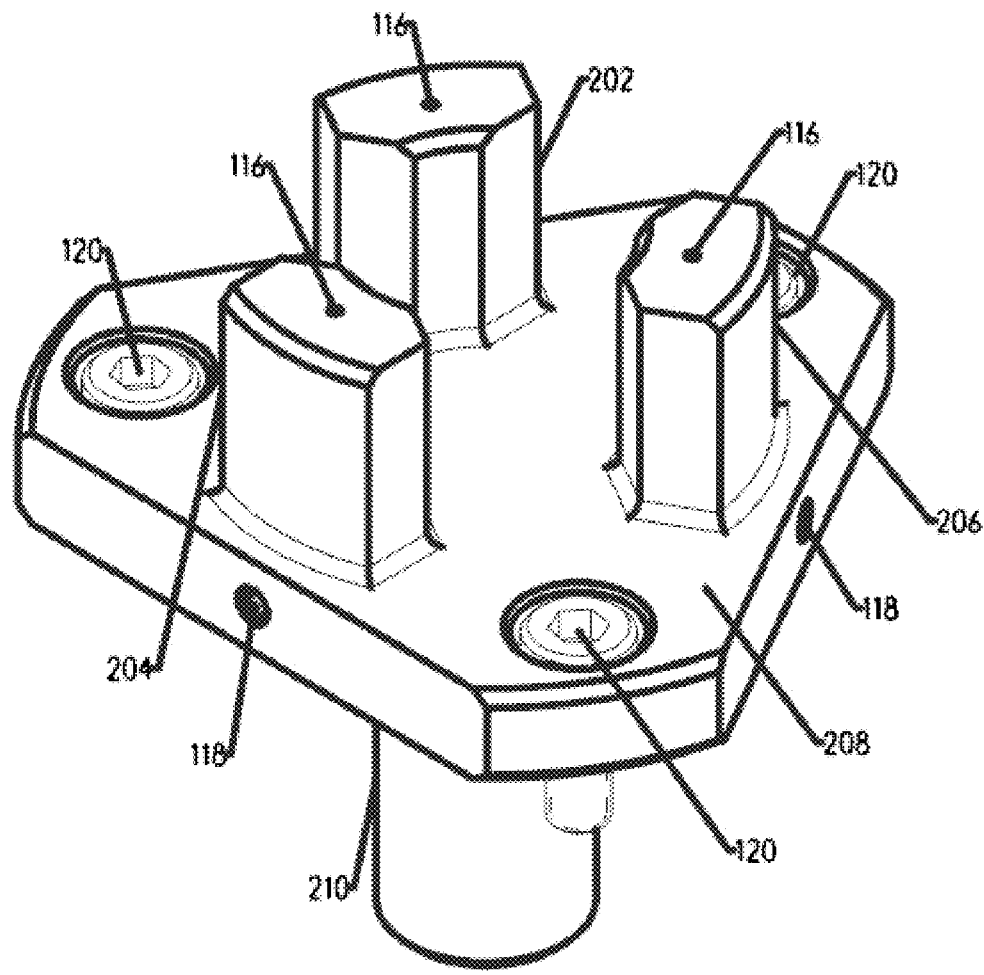
FIG. 2 is an isometric view of a chuck locator of a top-tooling device in accordance with the teachings of this disclosure.

The locator 106 is further illustrated in FIG. 2. The locator 106 includes a locator platform 208, three locator posts 202, 204 and 206 extending away from the locator platform 208, and a receiver diameter 210 extending from the locator platform 208. An air media hole 116 is drilled through each of the locator posts 202-206 for the purpose of sensing the object 108 seating on the locator 106 by sensing the air differential. A sensing device includes one or more sensors. Three mounting bolts 120 are used to mount the locator 106 to the chuck body 102. When mounted to the chuck body 102, the locator platform 208 mates with the chuck face 110. Three pin plug screws 118 on the three sides of the locator platform 208, disposed in the intersecting internal media journals, are required to prevent any pressure loss. However, the pin plug screws 118 can cause undesirable false sensor signal, and thus lower the accuracy of the sensing of the object 108. For example, leakage from the pin plug screws 118 can occur.

Figure 3:
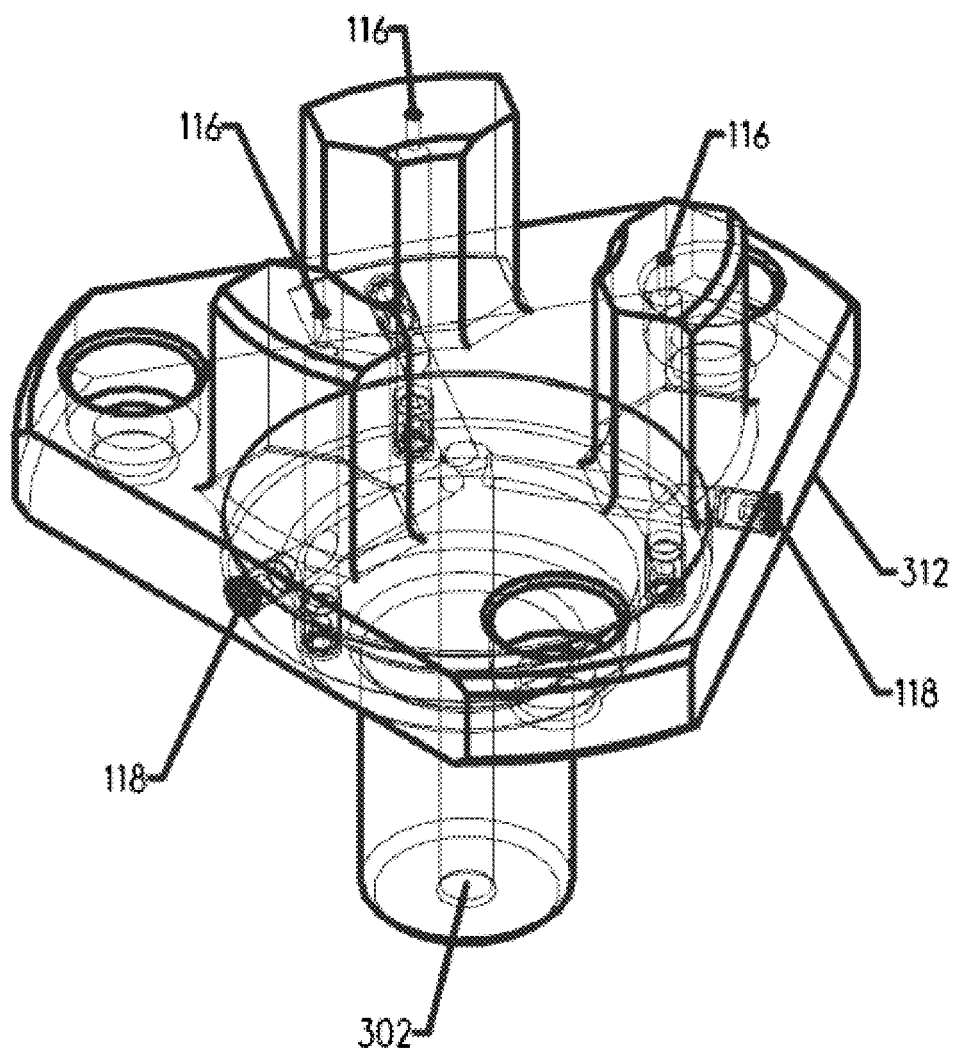
FIG. 3 is a transparent isometric view of a chuck locator of a top-tooling device in accordance with this disclosure.

A transparent view of the locator 106 is shown in FIG. 3. A center media feed hole 302 is machined for access from a source input line. The center media feed hole 302 is branched out to three locating positions 116. The center media feed hole 302 and its three branches are sealed with the use of three respective pin plugs 118 to ensure proper functionality of the media circuit. A subtractive manufacturing process of machining is required to create the center media feed hole 302 and its three branches. This process leads to additional time, cost and complexity in manufacturing the locator 106. The locator 106 further incorporates a mounting surface 312 for engaging with the chuck face 110. A geometric control helps aligning the locator 106 with the chuck face 110.

The top-tooling device 112 is often made of hardened steel or alloy steel. It is thus heavy and leads to longer deceleration cycles and acceleration cycles. The mass of the top-tooling device 112 is a significant hurdle to the efficiency of the chuck 100.

Figure 4:
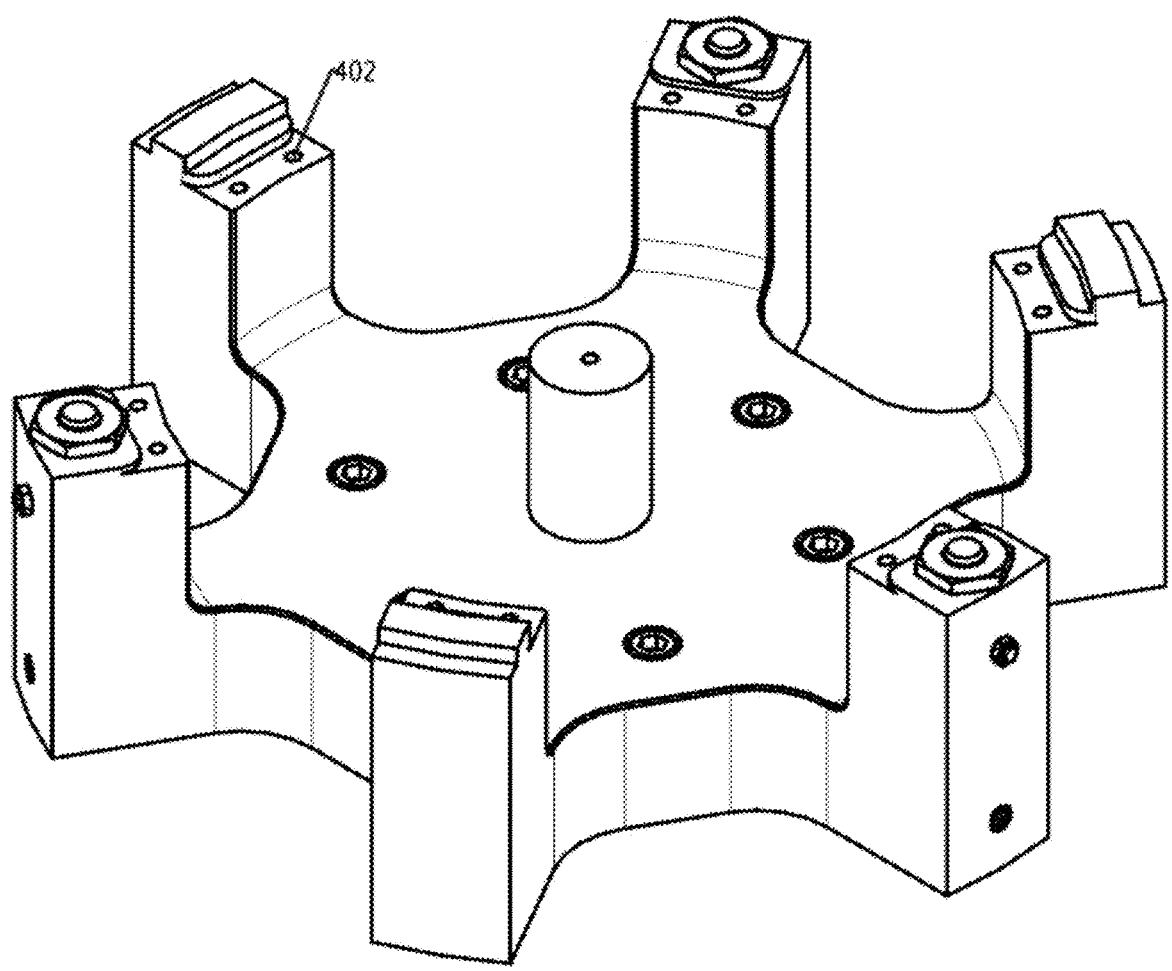
FIG. 4 is an isometric view of a top-tooling device in accordance with this disclosure.

To overcome the above-mentioned hurdles, top-tooling devices, such as the top-tooling device 400 shown in FIG. 4, made of aluminum have been developed. However, the aluminum top-tooling device 400 needs to accommodate the use of complex internal components and requires sophisticated engineering to properly perform the intended functions. The aluminum top-tooling device 400 thus leads to increased complexity, added manufacturing and additional overall time and cost. For instance, the aluminum top-tooling device 400 needs to incorporate, for example, helicoils 402 for preventing wear due to steel on aluminum threads. The heli-coil 402 is not required by top-tooling devices made of steel or alloy. Aluminum top-tooling devices reduce the deceleration cycle and the acceleration cycle while they have increased design complexity, added manufacturing and additional overall time.

The present teachings further reduce the mass of top-tooling devices by a factor of three or more and lead to even shorter deceleration cycles and acceleration cycles. In addition, the present teachings reduce the manufacturing cost of top-tooling devices. Moreover, the present teachings improve the efficiency of top-tooling engineering.

In accordance with the present teachings, a new type of top-tooling device is made of composite materials that have a high strength to weight ratio. The new top-tooling devices provide better efficiency without sacrificing strength. Lesser mass in the new top-tooling devices provide a key advantage for rotating metal cutting machinery.

Usually, a steel plate with a thickness of 5 mm acquires a 0.022 mm physical deformation under a loading of 30 MPa. As used herein, mm stands for millimeter while MPa stands for megapascal as a pressure unit. An aluminum plate with a thickness of 5 mm acquires a 0.034 mm physical deformation under a loading of 30 MPa. A composite plate with a thickness of 5 mm acquires a 0.038 mm physical deformation under a loading of 30 MPa. The analytical data above indicates that the strength of composite material is equivalent to that of aluminum and very close to that of steel.

Figure 5:
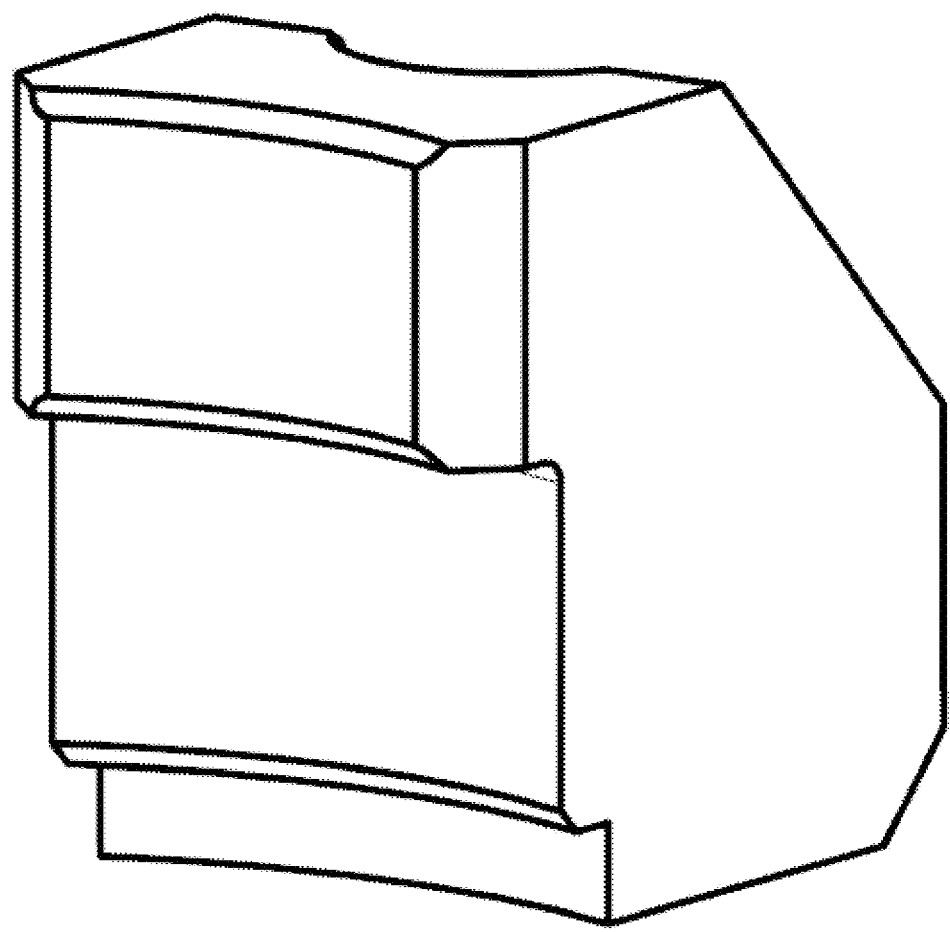
FIG. 5 is a perspective view of a composite block in accordance with this disclosure.
Figure 7:
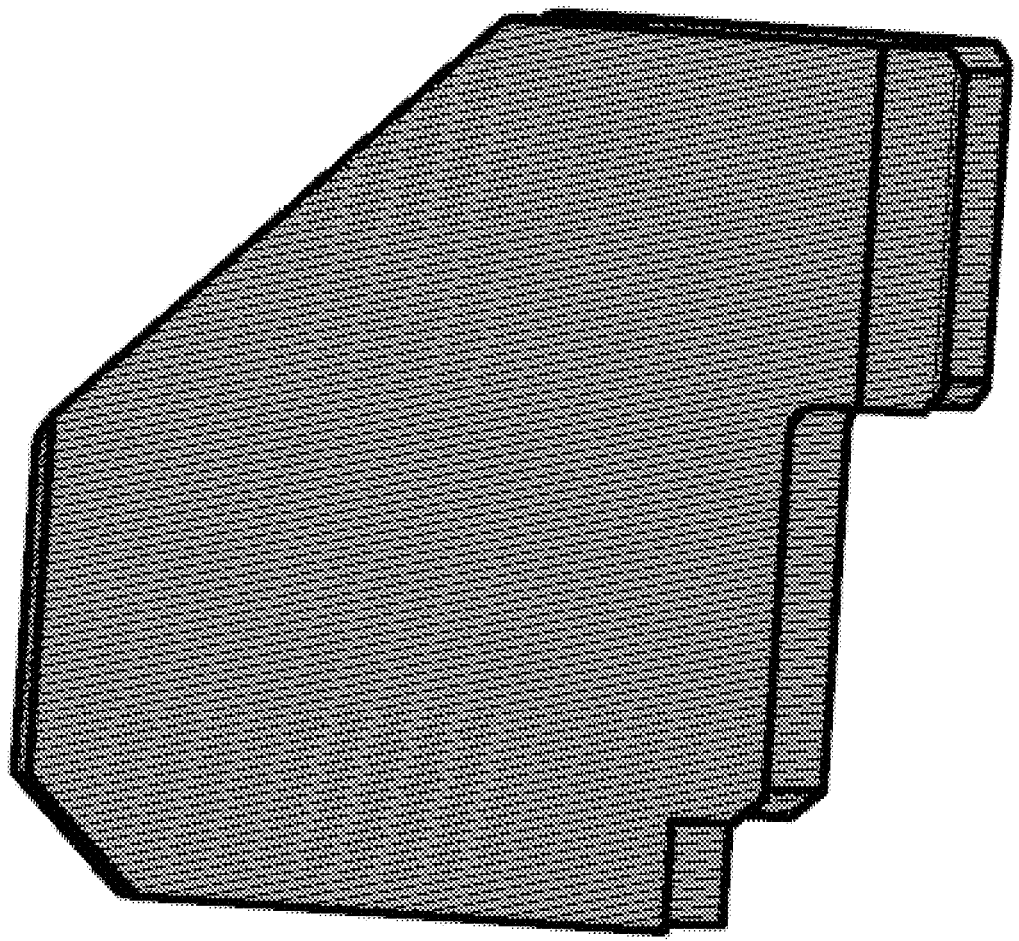
FIG. 7 is a perspective view of a printed top jaw of a top-tooling device made of composite material in accordance with this disclosure.

In one implementation, composite parts of a top-tooling device are manufactured from blocks of composite materials. For example, a top jaw of a top-tooling device is made from a composite block 500 shown in FIG. 5. In a different implementation, composite parts of a top-tooling device are manufactured using an additive manufacturing process, such as 3D printing. For example, a top jaw of a top-tooling device is printed by a 3D printer and indicated at 700 in FIG. 7

Figure 6:
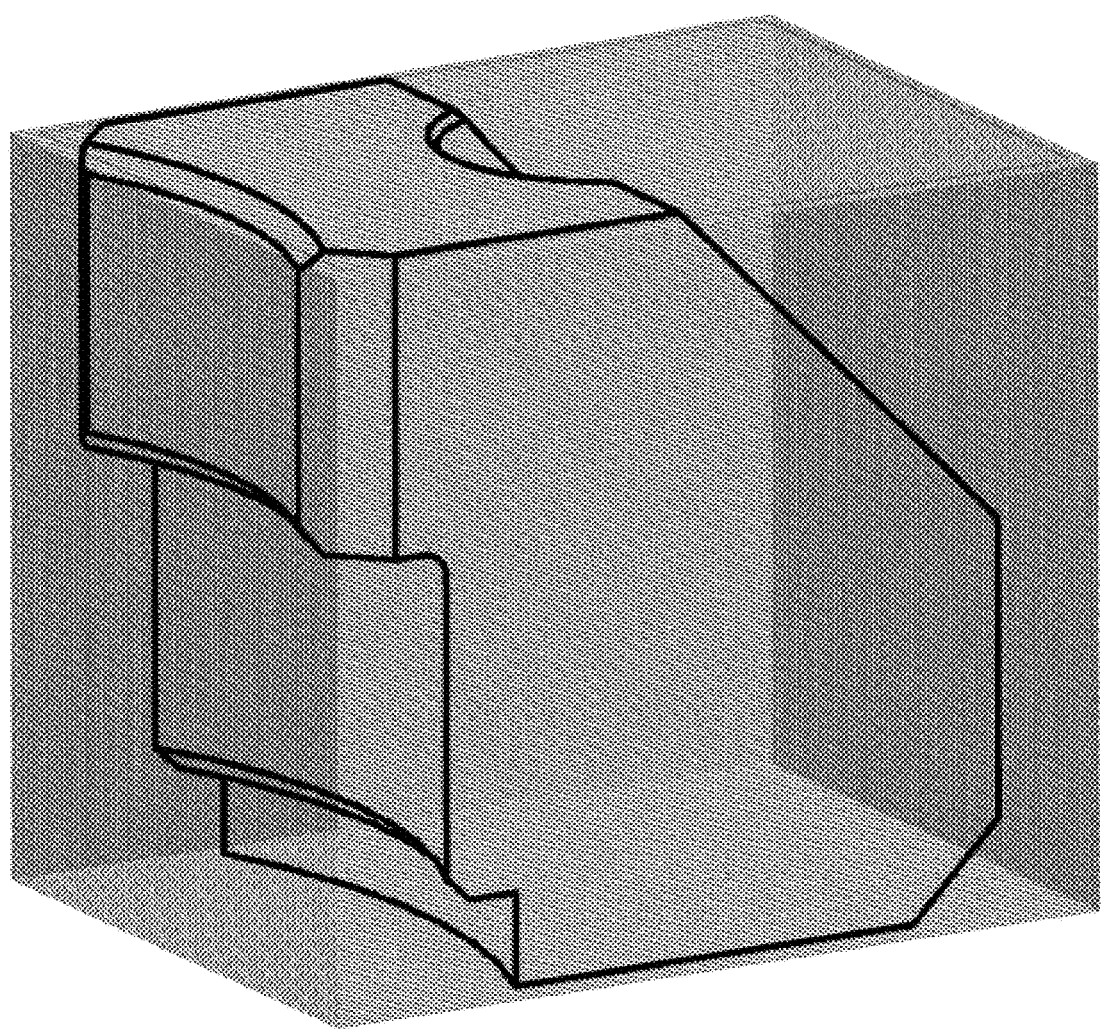
FIG. 6 is a perspective view of a printed top jaw of a top-tooling device made of composite material in accordance with this disclosure.

The additive manufacturing process for creating top-tooling devices provides numerous benefits. First, it can easily build complex profiles and create final geometry of top-tooling device parts by creating the union of individually laid layers. Each layer is an adjustable combination of resin and reinforcement. The direction in which the reinforcement is layered depends on the forces acting on the body during the actual application. A top jaw of a top-tooling device with layers of printing can be seen in FIG. 6 and indicated at 600

The minimum thickness of each layer and the reinforcement orientation can be varied depending on the 3D printer's configuration and the application requirements or complexity. The capability of variation reduces the need of using a chain of traditional manufacturing process to yield each single top-tooling part. Additionally, the 3D printer can be run unattended, resulting in significant labor cost savings. Further, it can be run during the off-peak business hours and/or off-peak energy usage hours.

Figure 8:
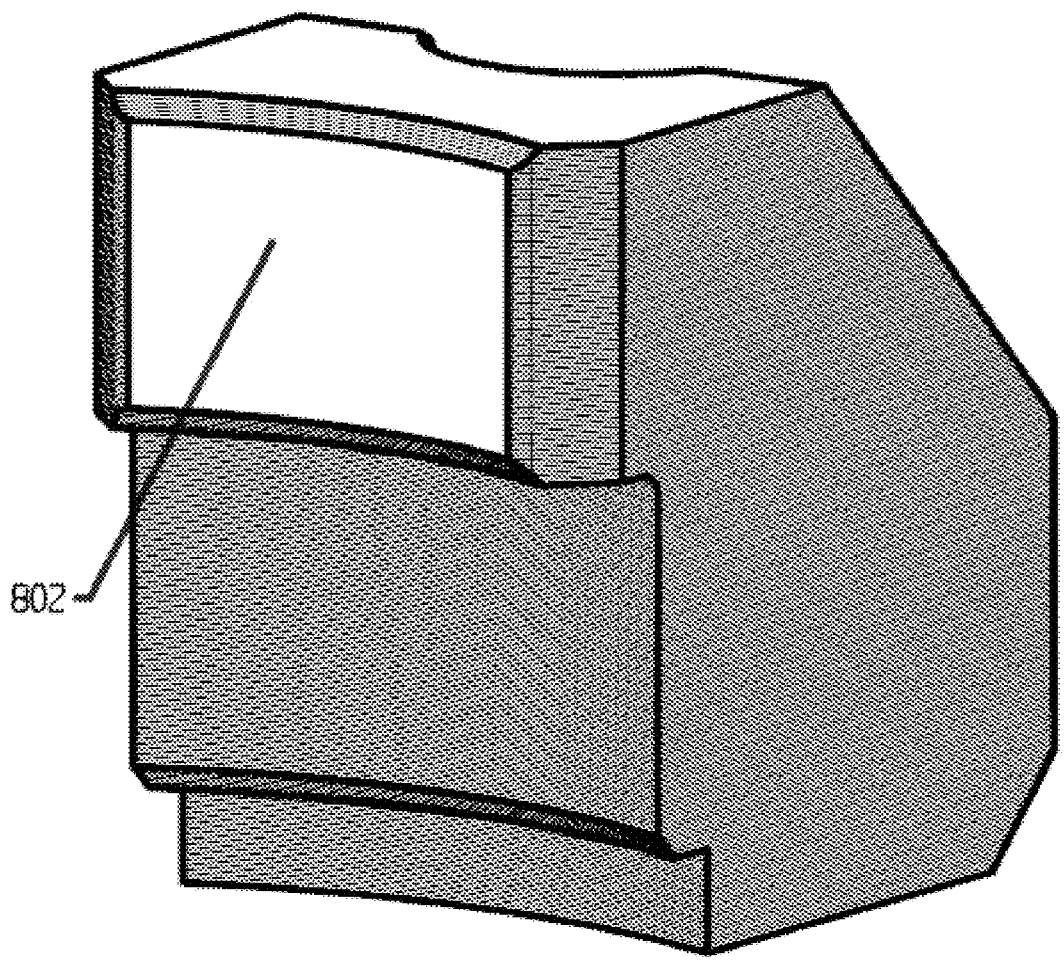
FIG. 8 is a perspective view of a printed top jaw of a top-tooling device with a finished surface in accordance with this disclosure.

Depending upon the application requirements of parts of top-tooling devices, the parts may require the allowance of finish machining to ensure that the accuracy be performed without any damage to the subject part structure. For example, a surface of a top-tooling device, such as a top jaw, may require a finishing. For instance, the top-jaw 800 with a machined smooth surface 802 is shown in FIG. 8. The finished surface 802 allows tight engagement between the top-jaw 800 and other parts or a workpiece.

Figure 9:
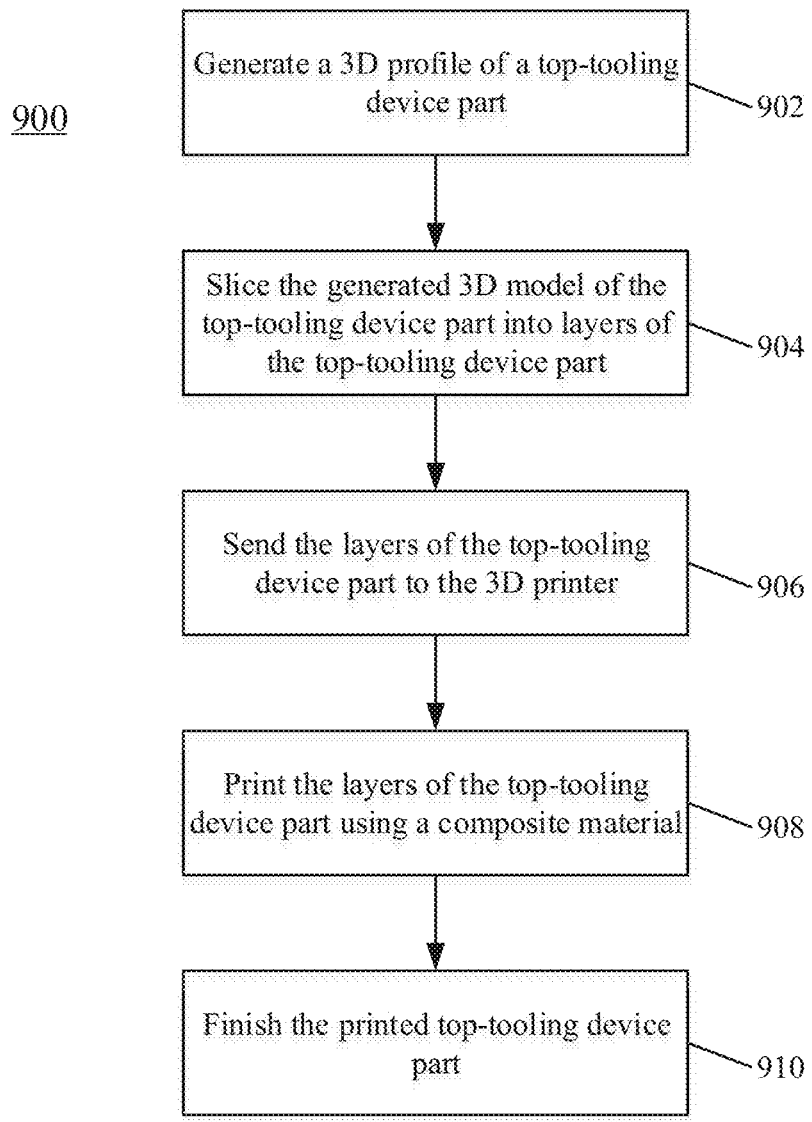
FIG. 9 is a flowchart depicting a process by which a top-tooling device part is created in accordance with this disclosure.

The new process of producing new types of top-tooling parts is further illustrated by reference to FIG. 9. Referring to FIG. 9, a flowchart depicting a process by which a top-tooling device part is created is shown and generally indicated at 900. At 902, a 3D model (also referred to herein as a profile) of a top-tooling device part (such as a top-jaw and a locator) is created. The 3D model can be created using a computer design software program. At 904, the 3D model is sliced into multiple layers of the top-tooling device part. At 906, the layers of the top-tooling device part are fed to a 3D printer. At 908, the 3D printer prints the layers of the top-tooling device part using composite material. At 910, the printed lightweight top-tooling device part goes through a finishing process. For example, one or more surfaces of the printed top-tooling device part are machined into smooth surfaces. The element 910 can be optional depending on the top-tooling device part being printed.

Since the printed top-tooling device part is created by the additive manufacturing process 900, all internal media journals are printed into the top-tooling device part. Accordingly, there is no need to separately machine intersecting holes that require sealing using the pin plug screws, such as the pin plugs 118. These connecting journals can be printed completely within the geometry layers and the number of spares can thus be reduced as shown in FIG. 10.

Figure 10:
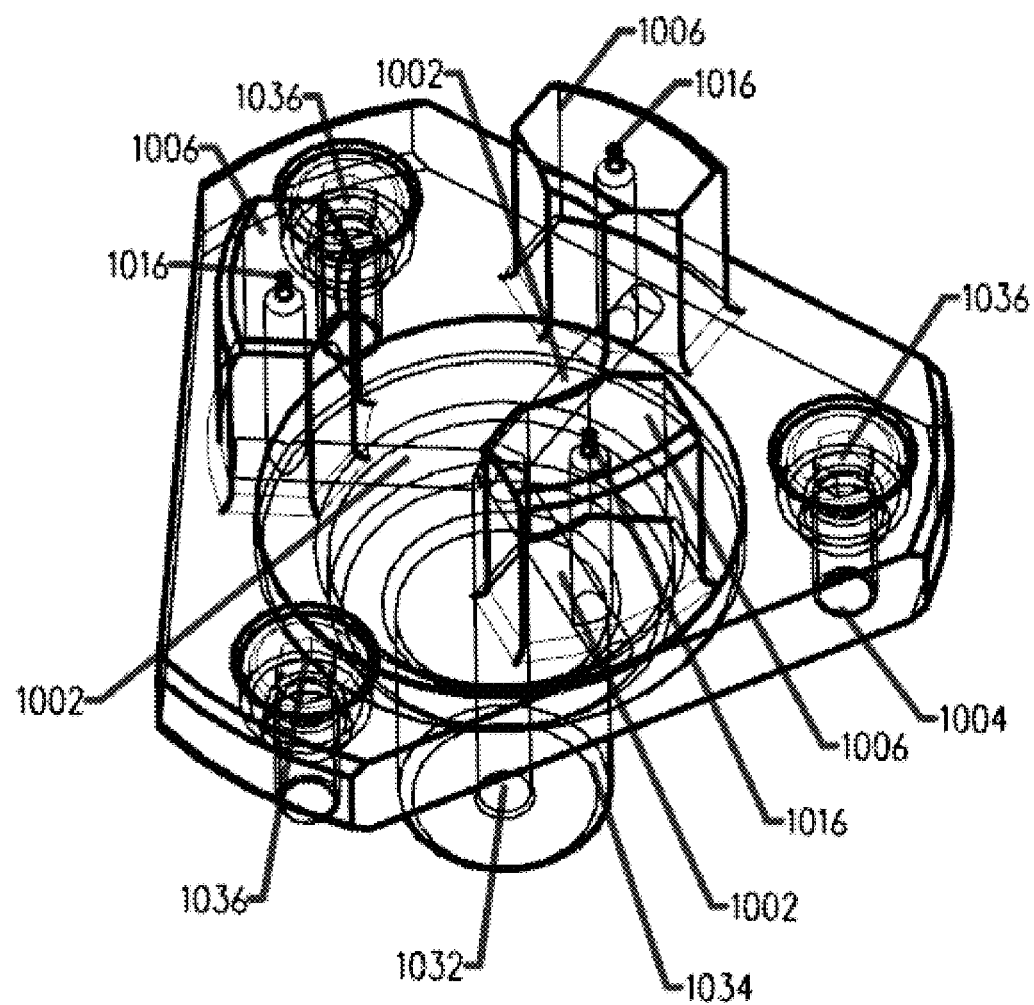
FIG. 10 is an isometric view of a printed top-tooling device locator in accordance with this disclosure.

Referring to FIG. 10, an isometric view of a printed locator is shown and generally indicated at 1000. The locator 1000 includes a locator platform 1004, three locator posts 1006 extending away from the locator platform 1004, and a rod 1034 extending from the locator platform 1004 in an opposite direction than the locator posts 1006. A media feeding hole is indicated at 1032.

The locator 1000 further includes an air media hole 1016 in each locator post 1006 for the purpose of sensing an object (such as the object 108) seating on the locator platform 1004 by sensing the air differential by a sensing device disposed inside the respective locator posts 1006. The sensing device includes one or more sensors. Three mounting holes 1036 are used to mount the locator 1000 to a chuck body (such as the chuck body 102). When mounted to the chuck body 102, the locator platform 1004 mates with the chuck face 110.

However, the lightweight locator 1000 does not have or require the pin plugs 118. The internal media journals 1002 do not extend through the side surface of the locator platform 1004 of the locator 1000. The air media holes 116 correspond to the internal media journals 1002 and communicate with the corresponding internal media journals 1002. The internal media journals 1002 are connected to the media feeding hole 1032.

Traditionally, sensing capabilities are added to top-tooling apparatus using pneumatic or hydraulic media. Such methods increase cost, consume more time and add constraints. For example, the added sensors require physical space and thus limit the design and even functionality of the top-tooling devices. For instance, holes may need to be drilled for receiving sensing devices. The drilled holes connect with main air-line for sensing of part presence confirmation. In such a case, sufficient care is required to seal the connections from leakage; and design freedom is thus limited. As an additional example, the added sensing devices limit engineers to consider all manufacturing and material limitations. Moreover, the added sensing devices increase the weight of the top-tooling device in special cases and thus increase the deceleration and acceleration cycles.

Figure 11:
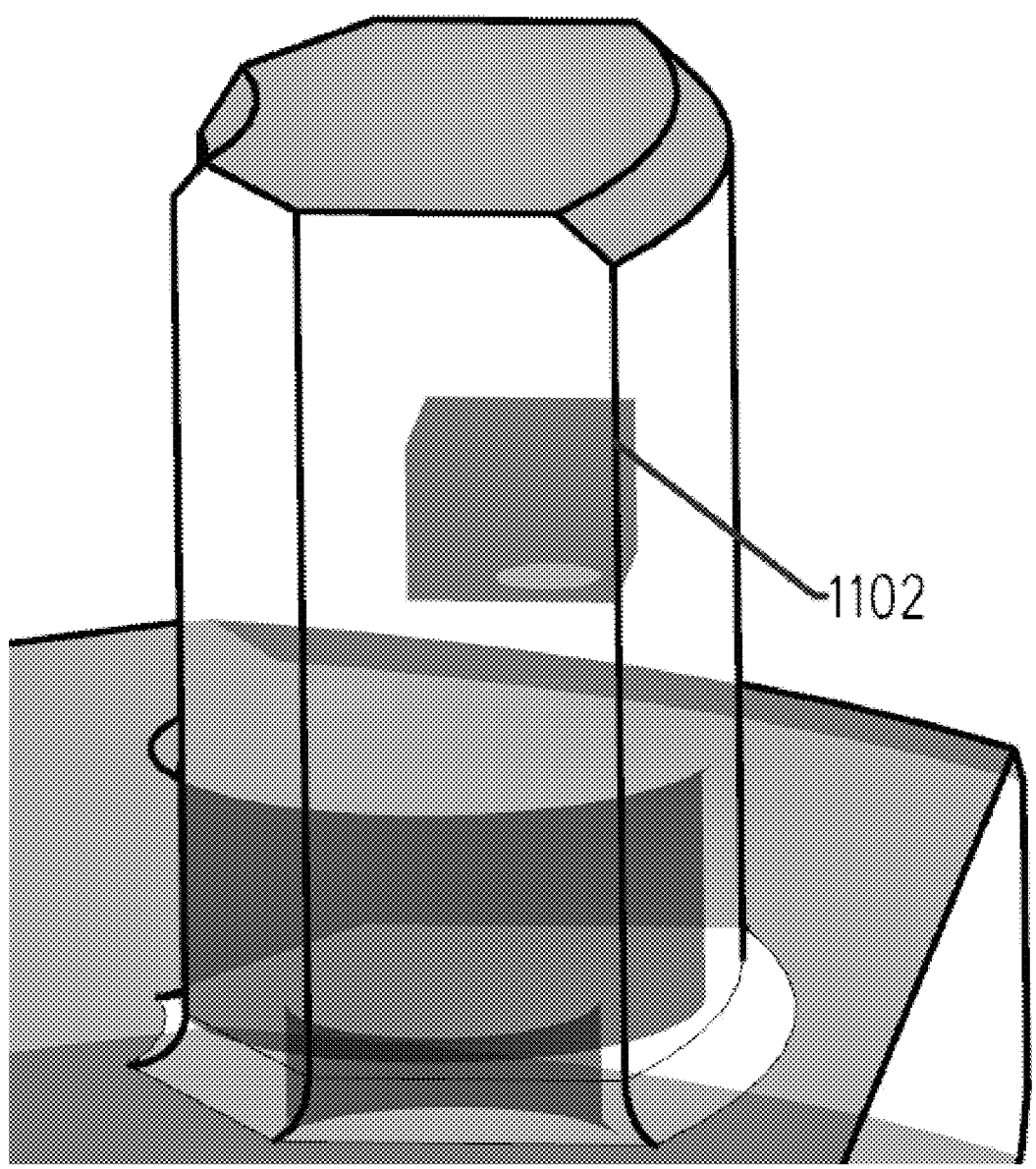
FIG. 11 is an isometric view of a printed integrated top-tooling device locator in accordance with this disclosure.

Referring to FIG. 11, a partial view of an integrated top-tooling locator is shown and generally indicated at 1100. For example, the prominent part shown herein is one of the three locator posts 1002 (shown in FIG. 10). A sensing device 1102 is embedded inside the locator 1100. The sensing device 1102 is disposed within a provision created during the printing process. The integration of the top-tooling device part 1100 with the sensing device 1102 avoids shortcomings of the conventional top-tooling devices and provides numerous advantages. For example, there is no need for machining holes or any extra manufacturing to be done. The size of the sensing device allows for an increased design freedom for the engineers. As an additional example, the integration allows engineers more freedom in designing and manufacturing devices. The sensing device 1102 is integrated with the locator 1102 during the printing process of the locator. The improved printing process is further illustrated by reference to FIG. 12.

Figure 12:
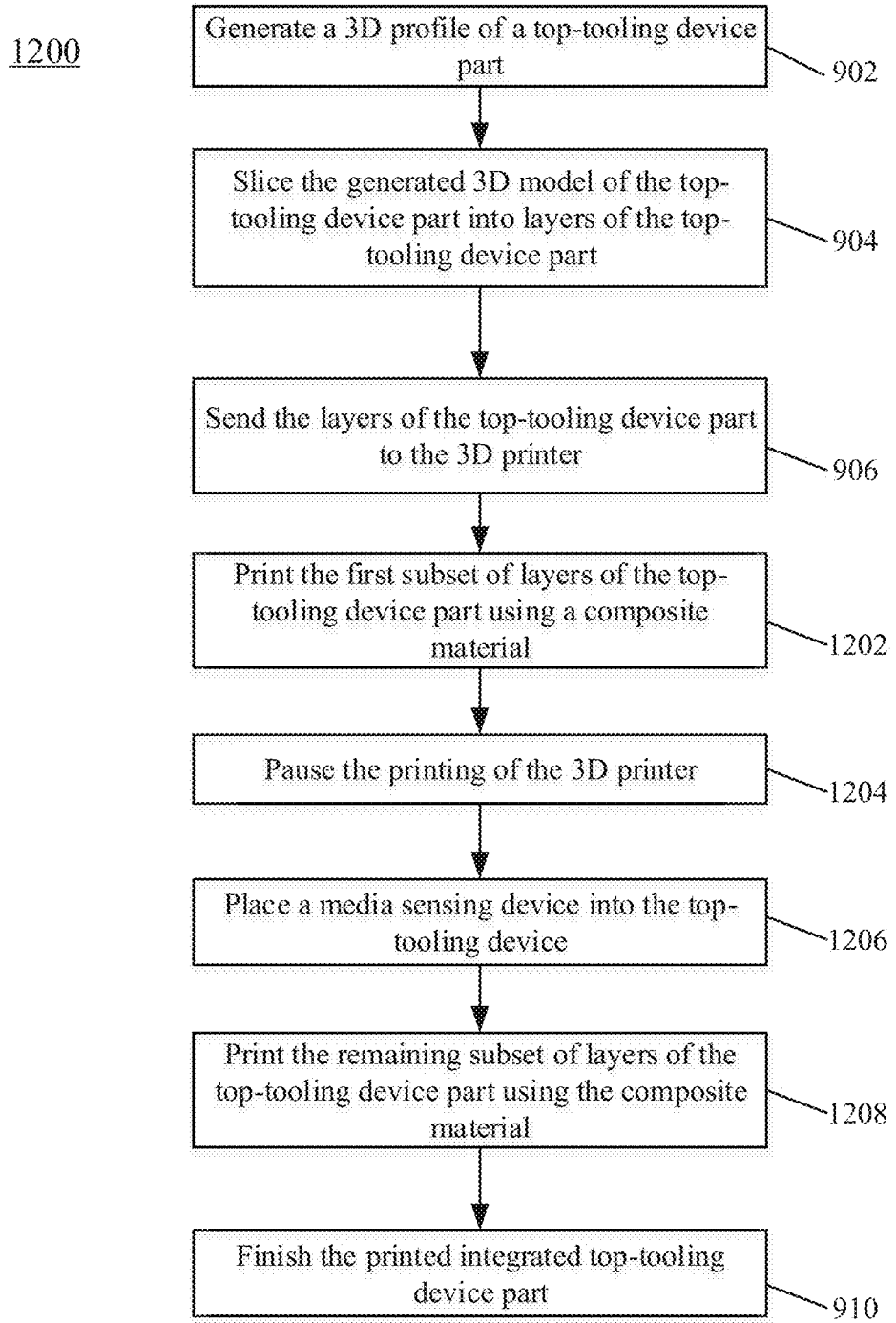
FIG. 12 is a flowchart depicting a process by which an integrated top-tooling device part is created in accordance with this disclosure.

Referring now to FIG. 12, a flowchart depicting a new processing by which integrated top-tooling devices are printed is shown and generally indicated at 1200. The process 1200 is an improved process of the process 900. At 1202, the 3D printer prints a first subset of the layers of the top-tooling device part using a composite material. At 1204, the printing of the top-tooling device is paused. At 1206, a sensing device (such as the sensing device 1102) is placed into the top-tooling device part. For instance, the printing process forms a cavity for receiving the sensing device 1102 when the element 1202 is performed. The sensing device can be placed manually or automatically. At 1208, the 3D printing of the top-tooling device is resumed to print the remaining layers of the top-tooling device. Both the processes 900 and 1200 avoid turning, drilling, milling and grinding that are required in manufacturing steel top-tooling devices.

Figure 13:
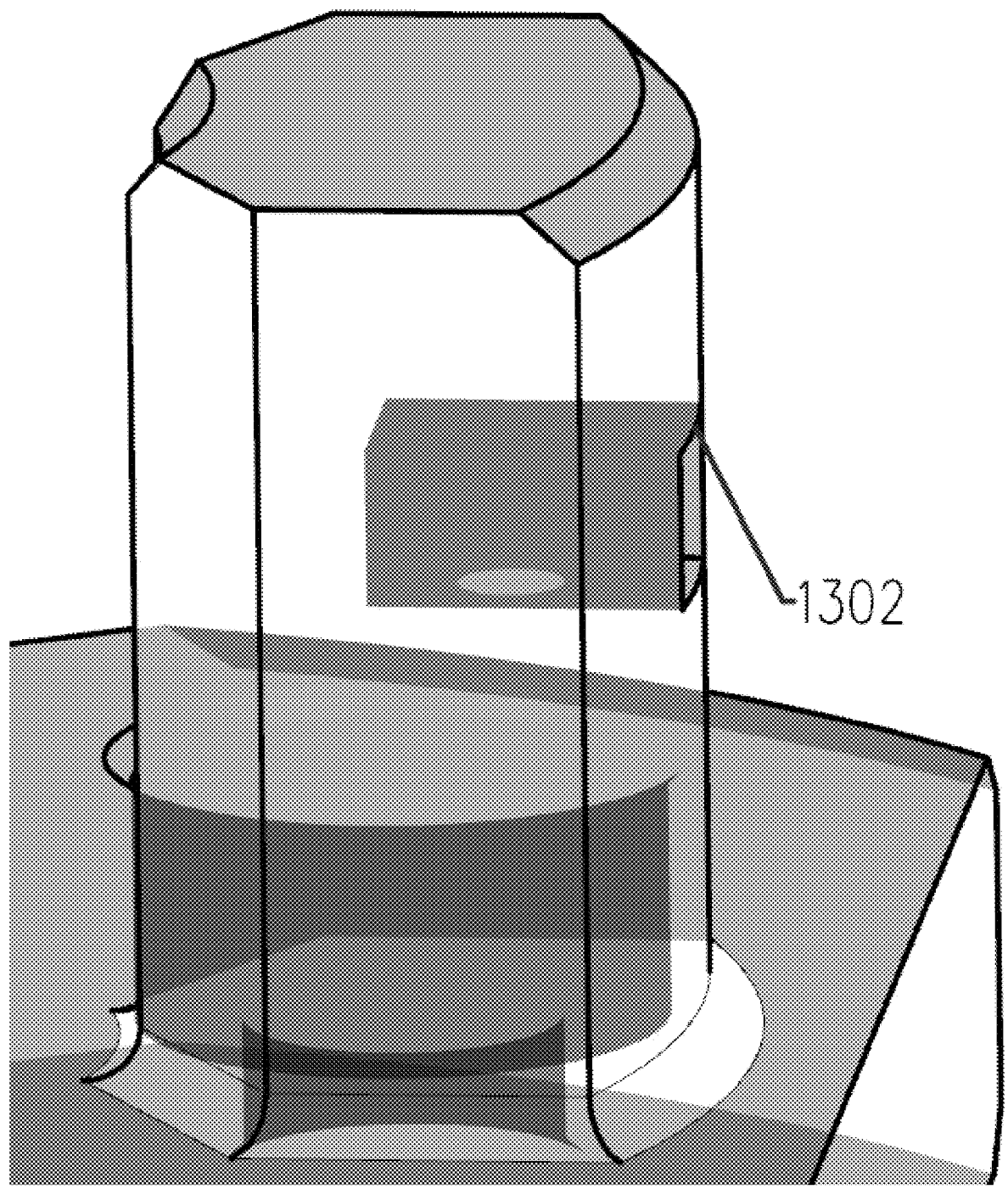
FIG. 13 is an isometric view of a printed integrated top-tooling device locator in accordance with this disclosure.

The sensing device 1102 is disposed completely inside the top-tooling part 1100. Alternatively, a sensing device is inserted into a cavity created during the printing process. For example, as shown in FIG. 13, a sensing device 1302 is inserted into a cavity formed when the top-tooling part 1300 is printed. Accordingly, the elements 1204-1206 are not performed when the top-tooling part 1300 is printed. Both devices 1102 and 1302 are integral with the top-tooling devices 1100 and 1300 respectively. The instrumentation is then integral in the components and assembled to the chuck. The cavities receiving the instruments 1102 and 1302 respectively are designed when respective 3D models are created.

With integrated sensing devices, the intelligent top-tooling devices 1100 and 1300 improve in process monitoring, data collection, Industrial Internet of Things ("IIoT") monitoring, automation and data exchange in manufacturing technologies (such as Industry 4.0), process information retrieval from numerically controlled machine tools (such as MT Connect standard), and other structural health monitoring. Therefore, the integrated intelligent top-tooling devices 1100 and 1300 increase the reliability and efficiency of custom engineered solutions. They further provide higher design freedom to engineers, easy manufacturability, higher reliability, lower cost and lighter weight. The new top-tooling devices 1100 and 1300 can be as light as fifteen percent of their steel counterparts, while the cost can be a few percentages of their steel counter parts. They also require shorter time to create, and almost no supervision during manufacturing.

In one implementation, the lightweight top-tooling device parts 700, 1000, 1100 and 1300 are made of Carbon Fibre Reinforced Polymer ("CFRP"). CFRP has a density of about 1580 kg/m$^3$, while steel has a density of about 7850 kg/m$^3$, which is about five times that of CFRP. In addition, CFRP's Young's Modulus is about 142 GPa (meaning gigapascals), while steel's Young's Modulus is about 200 GPa. Therefore, the strength to weight ratio about 0.09 for CFRP, and 0.025 for steel. Accordingly, the new lightweight top-tooling devise have a much higher strength to weight ratio. For a block of 1 m$^3$ in volume, the structural index of steel is about 0.74 with weight of 7850 kg; and the structural index of CFRP is about 3.3 with weight of 1580 kg.

Figure 14:
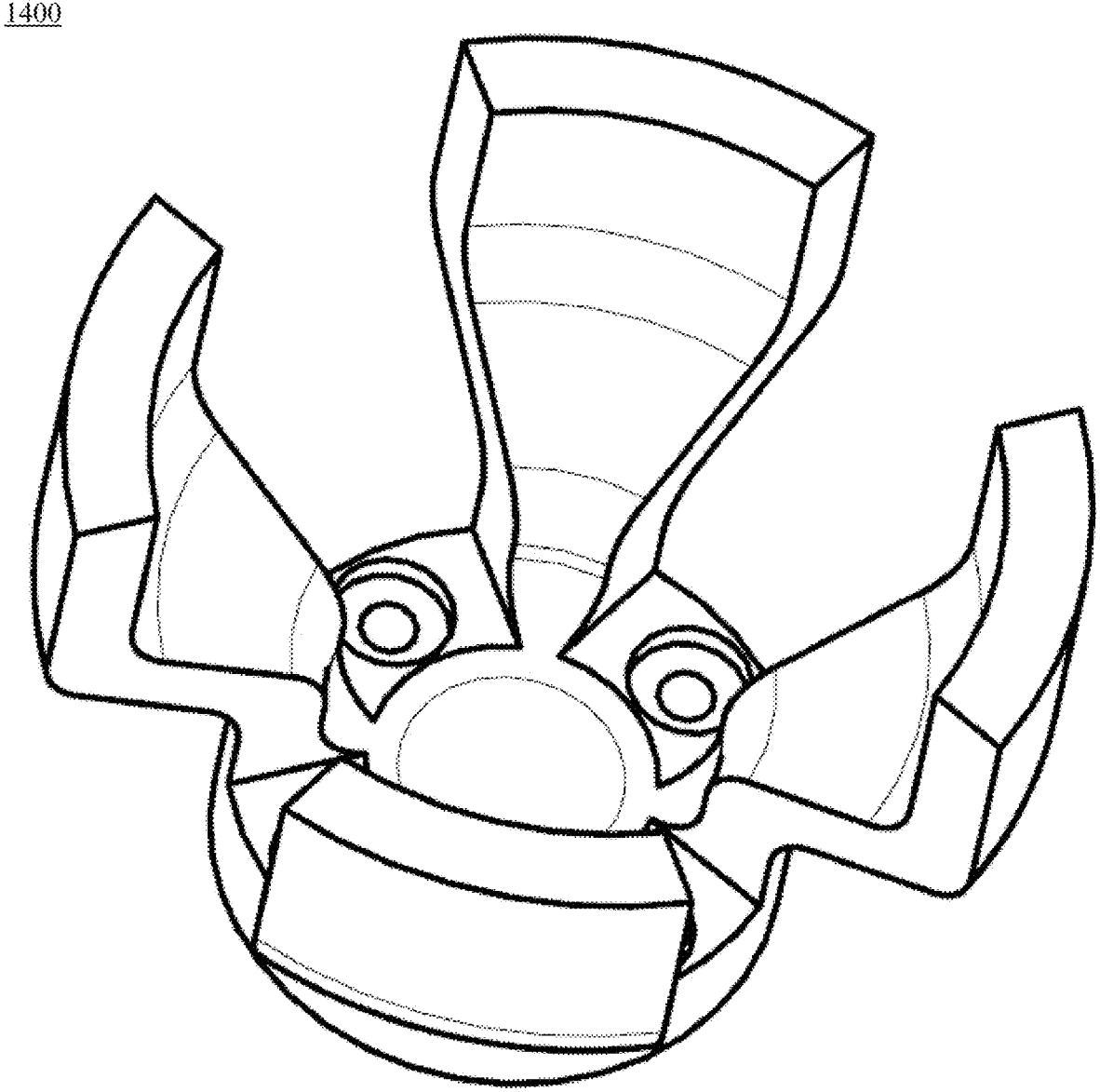
FIG. 14 is a perspective view of an organic lightweight top-tooling part in accordance with this disclosure.

In certain applications, a top-tooling device part held for machining need additional support to overcome the machining forces. However, when the top-tooling device part is printed using the process 900 or the process 1200, only the organic part is printed without the additional support required by the traditional manufacturing methods. In other words, the organic top-tooling device part, such as the illustrative organic top-tooling device part 1400 shown in FIG. 14, can be built as needed per the actual demand as per the application complexity and not limited by the manufacturing capability.

Figure 15:
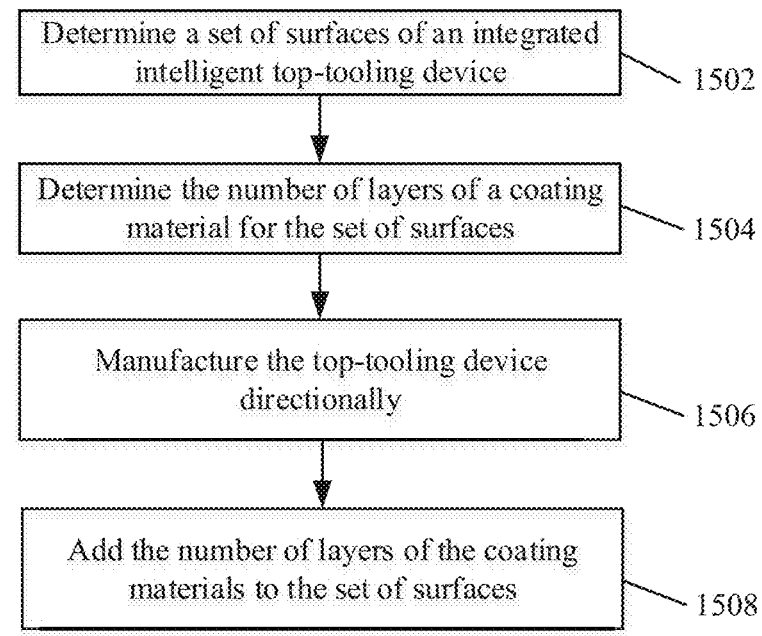
FIG. 15 is a flowchart depicting a process by which an integrated top-tooling device part is created in accordance with this disclosure.

The present teachings further significantly increase the tooling life of the integrated intelligent top-tooling devices by protecting the surfaces and material integrity thereof. The improvement is further illustrated by reference to FIG. 15. Referring now to FIG. 15, a flowchart depicting a process by which a surface of a printed integrated intelligent top-tooling device is machined to the tolerance and geometric integrity required for the workholding application is shown and generally indicated at 1500. At 1502, a set of surfaces of the top-tooling device is determined for increased surface smoothness. At 1504, the number of layers of a thermoplastic is determined. The amount of the thermoplastic depends on the particular workholding application. The amount of thermoplastic used on the surface layers also depends on a predetermined percentage of the total amount of thermoplastic used for a particular application. The use of one or more layers of thermoplastic improves the ease of machinability of subsequent processes known to produce heat. When a high working temperature is present, the configuration of the thermoplastic on the surface is adjusted to being present only on the bottom surface that mates with the host workholding face. This is done as the heat resistance of the thermoplastic is comparatively less to be used on the top face which might contact the hot working zone.

At 1506, the top-tooling devices are directionally manufactured by additive processes. In one implementation, each surface within the set of surfaces to be machined are created with the fibers perpendicular to the machining direction. At 1508, the number of layers of the coating material are applied to the set of surfaces. The proprietary coating material reduces the negative impact of heat generating during application, hot chips and machining load on the integrated intelligent top-tooling device.

Figure 16:
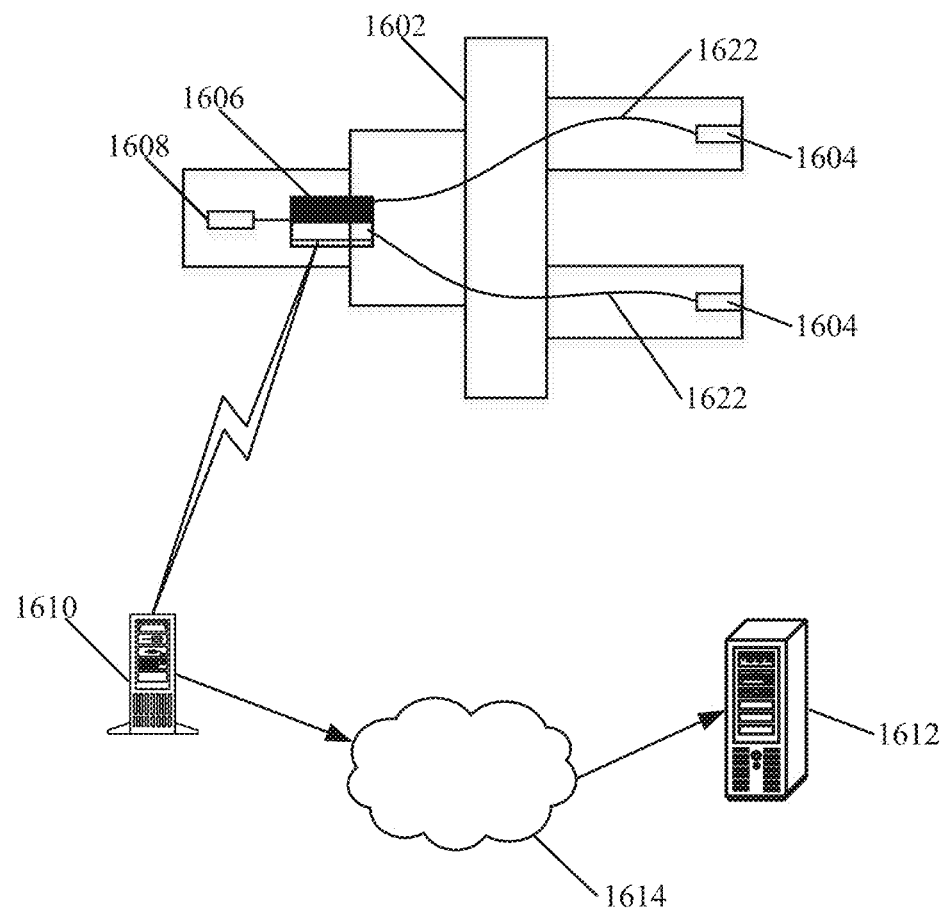
FIG. 16 is an illustrative block diagram of a lightweight top-tooling part and a communication system in accordance with this disclosure.

With integrated sensing devices, the intelligent top-tooling devices 106, 1100 and 1300 are further adapted to communicate with computer systems for collecting, storing, analyzing and using data gathered by the sensing device 1102 and 1302. The communication is further illustrated by reference to FIG. 16. Turning to FIG. 16, an illustrative block diagram of an intelligent top-tooling device 1602 and a communication system is generally shown and indicated at 1600. The integrated intelligent top-tooling device 1602 include a set of embedded sensing devices 1604, an electronic controller 1606 powered by a battery 1608 and communicating with the sensing devices 1604 over wired connections 1622. The controller 1606 (such as an electrical circuit board hosting a microprocessor) forwards data collected by the sensing devices 1604 to an agent device 1610 over a wireless connection. The wireless connection can be a Bluetooth Low Energy technology based wireless network link. The agent device 1610 communicates the data to a computer system 1612 (such as a server computer or a cloud server) over the Internet 1614.

In one implementation, the agent device 1610 and computer system 1612 communicates using a standard industrial protocol, such as the well-known MTConnect® protocol that is promoted by The Association for Manufacturing Technology. The computer system runs a MTConnect protocol compatible computer software application for receiving and analyzing the data collected by the embedded sensing devices 1604.

Figure 17:
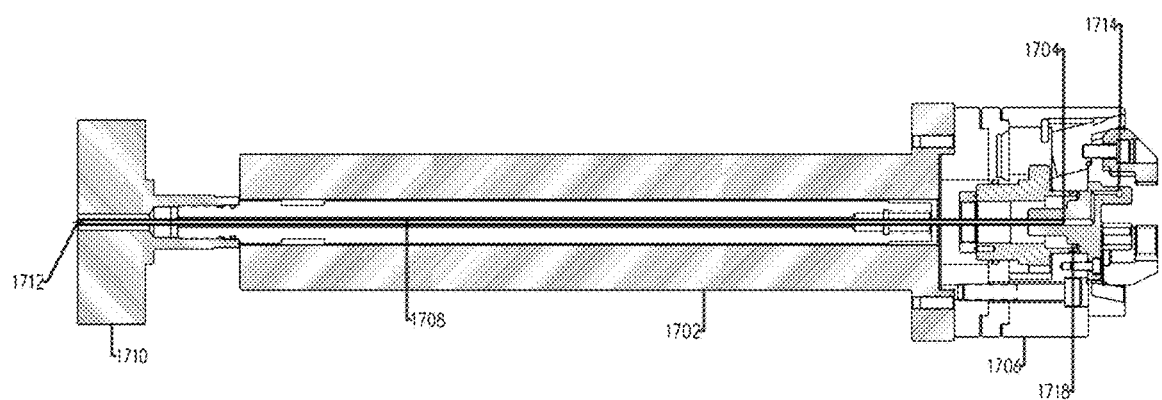
FIG. 17 is an illustrative block diagram of a cutting tool system in accordance with this disclosure.

In a different implementation, directing wiring to integrated sensing devices is made to connect to the mounting end of a top tooling. Referring to FIG. 17, an illustrative block diagram of a cutting machine system is shown and generally indicated at 1700. The cutting machine system 1700 includes a power chuck 1706, a machine spindle 1702, a hydraulic cylinder 1710, a wired connection 1708 from a cylinder end 1712 using slip rings to a top-tooling end 1704. The top-tooling end 1704 is wired to the embedded sensing devices 1714 of the intelligent top-tooling device. The cylinder end 1712 of the wired connection 1708 includes rotary units integrated with a slip ring. The wired connection 1708 passes through the mounting components to connect at the mounting end of the top tooling device 1718.

Direct wiring using custom rotary units integrated with slip ring for signal/data transfer at the cylinder end, the wiring passes through the mounting components to connect at the mounting end of the top tooling.

Figure 18:
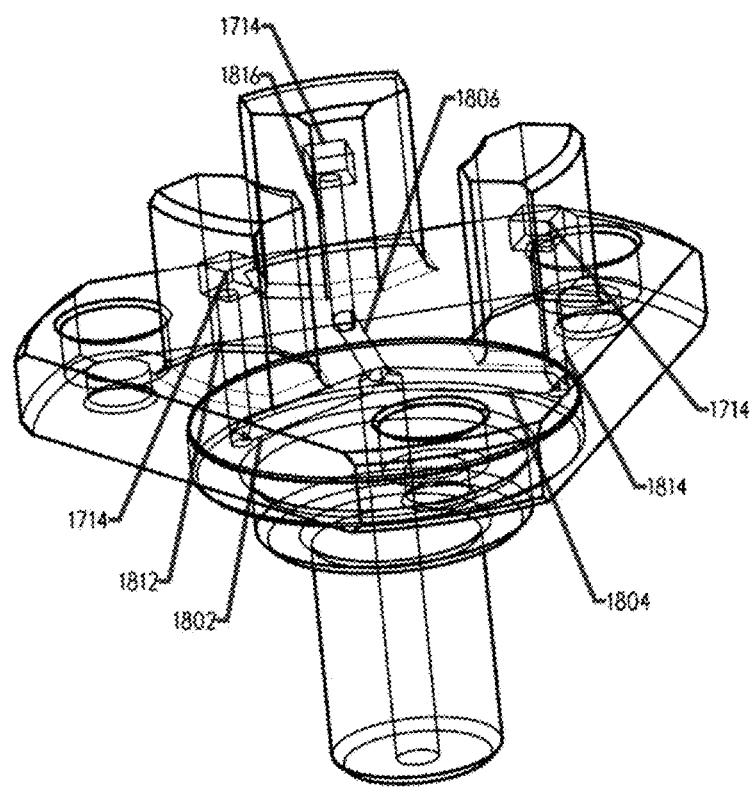
FIG. 18 is an isometric view of a printed top-tooling device locator in accordance with this disclosure.

Referring now to FIG. 18, an isometric view of a printed locator is shown and generally indicated at 1800. The intelligent lightweight top-tooling locator 1800 includes a locator platform incorporating three horizontal internal connecting journals 1802, 1804 and 1806, three locator posts extending away from the locator platform and incorporating three vertical internal connecting journals 1812, 1814 and 1816, and a receiver extending from the locator platform in an opposite direction than the three locator posts. The three horizontal internal media journals 1802-1806 interconnect and communicate with the controller circuit consisting of 1606, 1608, 1610, 1612 and 1614 as indicated at 1600. Furthermore, the vertical internal media journals 1812-1816 connect with three internal media journals 1802-1806 respectively which serves as a provision to accommodate the wiring 1622 as seen in 1600. The vertical internal media journals 1812-1816 do not extend to the top surfaces of the corresponding three locator posts. The horizontal internal media journals 1802-1806 do not extend through the side surfaces of the locator platform either. Each locator post further incorporates a sensing device 1714. The three sensing devices 1714 are disposed within three cavities created during the printing process of the intelligent lightweight top-tooling locator 1800. Based on the strain due to mechanical force, the intelligent top-tooling device 1800 detects the presence of a workpiece. In the other case with air media holes as indicated in 1000, an intelligent top tooling device detects a workpiece based on pneumatic pressure differences detected by sensing devices located on the cylinder end.

Obviously, many additional modifications and variations of the present disclosure are possible in light of the above teachings. Thus, it is to be understood that, within the scope of the appended claims, the disclosure may be practiced otherwise than is specifically described above. For example, the lightweight intelligent top-tooling devices 1100 and 1300 can integrate with other types of instruments, instead of the sensing devices 1102 and 1302 respectively. As an additional example, The foregoing description of the disclosure has been presented for purposes of illustration and description, and is not intended to be exhaustive or to limit the disclosure to the precise form disclosed. The description was selected to best explain the principles of the present teachings and practical application of these principles to enable others skilled in the art to best utilize the disclosure in various embodiments and various modifications as are suited to the particular use contemplated. It should be recognized that the words "a" or "an" are intended to include both the singular and the plural. Conversely, any reference to plural elements shall, where appropriate, include the singular.

It is intended that the scope of the disclosure not be limited by the specification, but be defined by the claims set forth below. In addition, although narrow claims may be presented below, it should be recognized that the scope of this invention is much broader than presented by the claim (s). It is intended that broader claims will be submitted in one or more applications that claim the benefit of priority from this application. Insofar as the description above and the accompanying drawings disclose additional subject matter that is not within the scope of the claim or claims below, the additional inventions are not dedicated to the public and the right to file one or more applications to claim such additional inventions is reserved.

What is claimed is:

1. A lightweight intelligent top-tooling device made of composite material, said lightweight intelligent top-tooling device comprising:
   1) a locator platform;
   2) a set of locator posts extending away in a first direction from said locator platform;
   3) a receiver extending away from said locator platform in an opposite direction of said first direction, wherein said locator platform, said set of locator posts and said receiver are printed by a 3D printer using carbon fiber reinforced polymer;
   4) a set of air media holes corresponding to said set of locator posts, each air media hole disposed within a corresponding locator post within said set of locator posts;
   5) a set of internal media journals including a first media journal disposed within said receiver and a subset of media journals disposed within said locator platform, said subset of media journals corresponding to and communicating with said set of air media holes, each internal media journal within said set of internal media journals not extending through a side surface of said locator platform;
   6) a set of sensing devices disposed within cavities of said set of locator posts and adapted for sensing an air differential for locating an object seating on said set of locator posts, each sensing device within said set of sensing devices including a sensor adapted to locate said object, said cavities created by said 3D printer; and 7) a set of mounting holes adapted for attaching said top-tooling device to a surface of a chuck.

2. The lightweight intelligent top-tooling device of claim 1 further comprising an electronic controller connected to said set of sensing devices via wired connections, wherein said electronic controller is adapted to communicate data collected by said set of sensing devices to an agent device over a Bluetooth Low Energy wireless connection, and wherein said agent device is adapted to communicate with a computer system over the Internet using a MTConnect protocol.

3. A lightweight intelligent top-tooling device made of composite material, said lightweight intelligent top-tooling device comprising:
 1) a locator platform;
 2) a set of locator posts extending away in a first direction from said locator platform;
 3) a receiver extending away from said locator platform in an opposite direction of said first direction;
 4) a set of air media holes corresponding to said set of locator posts, each air media hole disposed within a corresponding locator post within said set of locator posts, said air media hole not extending through a top surface of corresponding locator post within said set of locator posts;
 5) a set of internal media journals including a first media journal disposed within said receiver and a subset of media journals disposed within said locator platform, said subset of media journals corresponding to and communicating with said set of air media holes, each internal media journal within said set of internal media journals not extending through a side surface of said locator platform;
 6) a set of sensing devices disposed within said set of locator posts and adapted for sensing an air differential for locating an object seating on said set of locator posts; and
 7) a set of mounting holes adapted for attaching said top-tooling device to a surface of a chuck.

4. The lightweight intelligent top-tooling device of claim 3 wherein said top-tooling device is printed using a 3D printer.

5. The lightweight intelligent top-tooling device of claim 4 wherein said composite material is carbon fiber reinforced polymer.

6. The lightweight intelligent top-tooling device of claim 4 wherein said set of sensing devices is integrated with said top-tooling device, each sensing device within said set of sensing devices including a sensor.

7. The lightweight intelligent top-tooling device of claim 6 wherein said sensor is adapted to locate said object.

8. The lightweight intelligent top-tooling device of claim 6 wherein each sensing device within said set of sensing devices is disposed within a corresponding cavity created by said 3D printer.

9. The lightweight intelligent top-tooling device of claim 8 further comprising an electronic controller connected to said set of sensing devices via wired connections, wherein said electronic controller is adapted to communicate data collected by said set of sensing devices to an agent device over a first wireless connection, and wherein said agent device is adapted to communicate with a computer system over the Internet.

10. The lightweight intelligent top-tooling device of claim 9 wherein said first wireless connection is a Bluetooth Low Energy connection and said agent device communicates with said computer system using a MTConnect protocol.

\* \* \* \* \*